Nov. 12, 1968    H. STADLER ET AL    3,410,213

PROPELLANT CARTRIDGE FOR COMMERCIAL POWDER DRIVEN APPARATUS

Filed April 26, 1966    3 Sheets-Sheet 1

INVENTORS.
HANS STADLER
HEINZ GAWLICK
HANS UMBACH

BY *Dicke + Craig*
ATTORNEYS

INVENTORS.
HANS STADLER
HEINZ GAWLICK
HANS UMBACH

INVENTORS.
HANS STADLER
HEINZ GAWLICK
HANS UMBACH

United States Patent Office 3,410,213
Patented Nov. 12, 1968

3,410,213
PROPELLANT CARTRIDGE FOR COMMERCIAL POWDER DRIVEN APPARATUS
Hans Stadler, Nuremberg, Heinz Gawlick, Furth, and Hans Umbach, Stadeln, Germany, assignors to Dynamit Nobel Aktiengesellschaft, Troisdorf, Germany
Filed Apr. 26, 1966, Ser. No. 545,487
Claims priority, application Germany, May 15, 1965, D 47,277
30 Claims. (Cl. 102—39)

ABSTRACT OF THE DISCLOSURE

A propellant cartridge for commercial powder-driven apparatus used to drive bolts, nails, or the like into walls, etc., to stun animals to be slaughtered, and to deform materials, as well as for other related purposes. The cartridge case is molded from a thermoplastic material to have a completely closed forward end and is provided with a plurality of generally axially extending ribs from the forwardmost axially central tip rearwardly to the start of the bottom piece for providing thin walled rupture webs therebetween that will rupture upon ignition of the propellant charge to quickly release the propellant charge.

Background of the invention

There are various prior art apparatus for driving bolts, nails, or the like into masonry, concrete, iron, etc. Usually, the propellant cartridge is inserted into a blind-end bore-like recess of a cartridge holder, in a position ready for ignition. These apparatus usually have means to receive and hold a bolt, nail, or the like for driving into a receiving material during the burning of the cartridge propellant charge. The cartridge holder may act as a closure or breech mechanism; it may be rigidly locked with respect to the apparatus, or it may be a so-called mass closure.

Another type of prior art bolt setting device has a central axial blind-end bore for receiving a propellant charge. The bore is closed at the rear by means of a closure, which may be either a locked closure or a mass closure. The closure is at the end of a piston, which will drive the bolt, nail, or the like due to the reaction of the ignition of the powder of the propellant cartridge within the blind-end bore.

It is particularly important in commercial powder driven apparatus that no impurities remain within the apparatus after firing, which might impair the rapid reloading and satisfactory operation of the apparatus. The conventional propellant cartridge has a metallic sleeve or case generally closed at the forward end by means of a folding closure, a percussion sensitive detonator, composition at the rear end, and a propellant powder charge to be ignited by the detonator composition within the case. When this type of cartridge is fired, the small particles will splinter off during the rupture and tearing away of the case bottom and the deformation of the case shaft.

Summary of the invention

It is an object of the present invention to provide a simple, inexpensive, and effective cartridge for commercial powder driven apparatus that will not have the disadvantages noted above.

In order to eliminate the above-noted disadvantages, the present invention provides a cartridge case with a case shaft closed at the forward end, a bottom piece in tight sealing engagement with the rear end of the case shaft, preferably by a force fit, and a primer or the like carried by the bottom piece. Preferably, the case shaft will be constructed of a plurality of rib portions extending in axial planes to the forward end. Adjacent rib portions are circumferentially connected together over their entire length by thin walled webs.

The cartridge case of the present invention will tear open relatively easily due to the pressure of the gases produced by the burning of the propellant charge. The thin walled webs between the rib portions will constitute zones of rupture and will permit the gasses produced by the burning powder to freely leave the cartridge case and enter the cartridge bearing bore without tearing off pieces of the cartridge case. Thus, the tearing and chipping of parts from the cartridge case shaft is eliminated; prior art propellant cartridges having a case shaft of uniform thickness would have parts torn and chipped from it to contaminate the apparatus. The cartridge is designed to open relatively easily in the forward direction by means of the rib portions; however, these ribs portions extend rearwardly only to approximately the forwardmost part of the bottom piece to leave an unribbed rear portion of the case shaft that is sufficiently strong to securely hold the bottom piece against the predominately forwardly oriented propellant charge forces so that the case shaft will not be torn from the bottom piece. When the cartridge bearing is closed by means of a mass closure so that the bottom piece and the closure move rearwardly under the action of the propellant powder charge pressure, it is desirable to detachably secure the bottom piece within the case shaft by pressing it into the rear end of the case shaft to eliminate the danger that the case shaft will be torn off of the bottom piece; this is a particularly advantageous manufacturing technique.

It is another advantage of the present invention that the contact surface between the rib portions of the case shaft and the wall of the cartridge bearing bore is smaller than the surface contact between a smooth walled prior art case shaft and a corresponding cartridge bearing bore. Therefore, the cartridge case of the present invention will have a smaller frictional force resisting the withdrawal or automatic ejection of the cartridge case than would be the case with the prior art devices; that is, the cartridge case of the present invention is simple and easy to remove. Further embodiments of the invention provide ribbed portions having a profile cross section tapered toward the outside to further reduce the frictional contact surface. In addition, the friction between the cartridge case shaft and the bearing bore wall is further reduced because the gasses from the propellant charge will escape between the adjacent rib portions and enter the space between the ribs portions and the bearing bore wall to counteract the pressure within the cartridge case, which tends to deform the cartridge case shaft outwardly. If desired, the case shaft rib portions may be constructed so that the propellant gas will force the rib portions toward the center of the cartridge case, particularly with a correspondingly shaped bearing bore.

In addition to having externally tapered profile cross section ribs, the case shaft may be provided with internal ribbing to increase the strength of the rib portions and more clearly define the thin walled webs. Preferably, the internal ribbing will be tapered inwardly to maintain adequate space for the propellant powder charge and stabilize the rib portions. Preferably, the outside of the rib portions will be flush with the unribbed portion of the case shaft at their junction to provide shoulder shaped ledges at the junction. The gases produced by the propellant powder charge will exert a rearwardly directed force against the shoulder shaped ledges to provide for the easy removal of the cartridge case from the bearing bore to assist withdrawal by an auxiliary device or to produce an automatic ejection. Since the rearwardly directed force is proportional to the surface area of the shoulder shaped ledges exposed to the gas produced by the propellant powder charge, it is preferable to make the interstices between the rib portions as large as possible. Therefore, it is preferable to employ a relatively small number of circumferentially spaced rib portions connected by corresponding relatively wide thin walled webs. Also, the outwardly tapered profile cross section of the rib portions enhances this effect. These features may be provided either individually or in various combinations with each other to produce the desired design effect.

To prevent splintering or tearing of the case shaft during ignition of the propellant powder charge, it is advantageous to have the bursting and tearing of the cartridge case start from the forward tip and progress rearwardly. This action may be controlled and assisted by a further embodiment of the present invention. According to this embodiment, the thickness of the connecting thin walled webs that are disposed between the rib portions decreases toward the forward tip of the case shaft so that rupture will occur first at the forward end in a relatively easy manner. Also, this action may be accomplished by correspondingly proportioning the rib portions. In all the embodiments of the present invention, the bursting pressure required to tear open the case shaft is influenced by the selected thickness of the case shaft; therefore, the cartridge case may be designed for a specific desired bursting pressure. With this construction of the case shaft, the propellant cartridge can be detonated in a forwardly opening cartridge bearing bore.

Another particularly simple and advantageous embodiment of the present invention provides a propellant cartridge having a cylindrical case and a planar forward end face. This cartridge construction is well suited for storage and automatic conveying. The inner surface of the end face is conical and the rib portions have a cross section that progressively decreases toward the center of the cartridge case.

The various embodiments of the present invention may employ a cartridge having a rim-fire ignition and a central-fire ignition. If the ignition takes place by percussion, the bottom piece may have an undesirable movement relative to the cartridge case caused by the percussion, particularly if the bottom piece has been secured within the rear end of the case shaft by means of pressing. This uncontrolled movement may have many undesirable effects. The present invention avoids this problem by providing a shoulder-shaped ledge within the case shaft for abutment with the bottom piece when the bottom piece is pressed within the case shaft. An alternative solution is the provision of a flange-like rim on the bottom piece for abutment with the rear end face of the case shaft, particularly for a bottom piece with rim-fire ignition.

The cartridge case of the present invention may have at least the shaft of the case constructed from a thermoplastic material, for example, polyethylene, polypropylene, polystyrene, polyamide or the like. The ductile-elastic characteristics of these materials will tend to prevent the splintering or tearing off of particles by heat, etc., produced from the ignition of the propellant powder charge of the cartridge. The mere provision of a thermoplastic material in a smooth walled cartridge case having a uniform thickness would not prevent the splintering and disintegration of the cartridge case; this material used in the ribbed construction of the present invention has particular advantages. In addition, the thermoplastic material may be of a suitable color to indicate a particular cartridge size; this would avoid the customary practice of coloring the tip of standard metal cartridges for indicating different cartridge sizes, which frequently produce an undesirable coloring and soiling of the cartridge bearing bore. Also, the bottom piece may be constructed of a thermoplastic material, particularly if the cartridge is to be electrically detonated. A thermoplastic bottom piece would simplify the manufacture of the cartridge case, because special provisions for insulation would be unnecessary.

*Brief description of the drawing*

Further objects, features, and advantages of the various embodiments of the present invention will appear from the following description of the drawing, in which:

FIGURE 4b is a partial cross sectional top view of the cartridge case of FIGURE 4a;

*Detailed description of the drawing*

Figure 1:
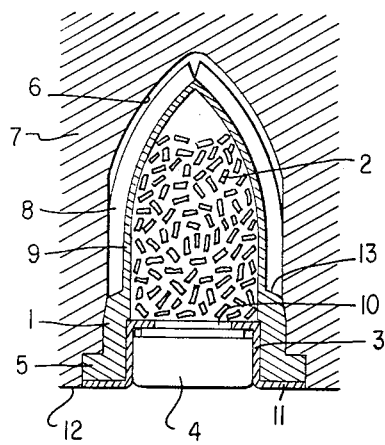
FIGURE 1 illustrates a propellant cartridge for central firing.

In the cartridge according to FIGURE 1, the case shaft 1 is filled with a propellant powder charge 2 and has a bottom piece 3 pressed into its rear end. The bottom piece 3 contains a primer 4. The rear end of the case shaft 1 is formed with an annular flange 5 for supporting engagement with the cartridge bearing bore 6 of the part 7, which may be the piston of a bolt setting device (not shown in detail). The forward portion of the case shaft 1 is provided with external rib portions 8, which are connected with each other in the circumferential direction and at the tip by means of relatively thin walled webs 9 to form an approximately ogival tip. The forward portion of the cup shaped bottom piece 3 has a central aperture 10 for the passage of the flash from the ignition of the primer 4 and is supported with its annular flange 11 on the annular flange 5 of the case shaft 1.

The propellant cartridge is inserted into the bearing bore 6 so that it will not project beyond the bottom surface 12 of the piston 7. After the propellant cartridge has been inserted, the bearing bore 6 is rearwardly closed by means of a closure (not shown), including a firing element (not shown) for example, a firing pin, tightly engaging the bottom surface 12, to prepare the apparatus for firing.

When firing the cartridge the firing element ignites the primer, which ignites the propellant charge 2. When the burning propellant gases have obtained a specific pressure, they burst open the cartridge case, including the tip of the case shaft 1, by tearing open the thin walled webs 9. In the usual construction of a powder driven device the piston 7 is moved forwardly by the pressure of the released propellant charge gases; in the case of a mass closure, the closure is moved in the opposite direction during the ejection of the bottom piece 3 and the primer cap from the case shaft 1. When the connecting webs 9 are torn open, the propellant charge gases will flow between the rib portions 8 and exert a pressure on the shoulder surfaces 13 to create a rearwardly directed force on the case shaft 1; this force will be in the opposite direction to the movement of the piston 7 and will cause the automatic ejection of the case shaft 1 from the bearing bore 6 of the piston 7.

Figure 2:
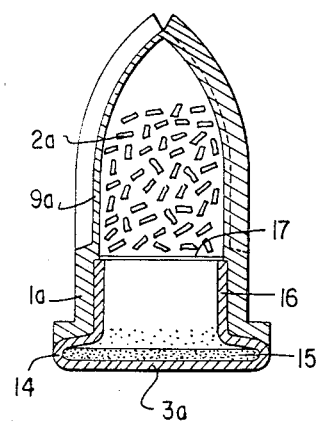
FIGURE 2 illustrates a propellant cartridge for rim firing.

In the cartridge according to FIGURE 2, the case shaft 1a is filled with a propellant powder charge 2a and has a forwardly opening bottom piece 3a pressed into its rear end. The bottom piece 3a has an annular bottom fold 14 and contains a priming composition 15. The bottom piece 3a is forwardly supported in the case shaft 1 by the bottom fold 14 and the forward end face of the annular cylindrical shaft 16. The forward end of the bottom piece 3 is closed by a covering plate 17, which may be a foil, to separate the propellant charge 2a and the priming composition 15. The thickness of the thin walled webs 9a decrease toward the tip of the case shaft 1a to provide the weakest wall structure at the tip of the case shaft 1a so that rupture of the thin walled web 9a to tear open the case shaft 1a will start from the tip of the case shaft 1a. The firing and operation of the cartridge of FIGURE 2 is the same as the firing and operation of the cartridge of FIGURE 1, except that ignition of the priming composition is accomplished by squeezing the bottom fold 14.

Figure 3:
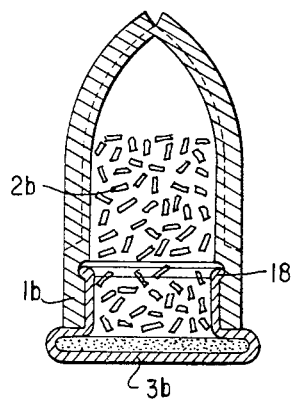
FIGURE 3 illustrates a modification of the cartridge of FIGURE 2.

The construction of the propellant cartridge of FIGURE 3 is similar to the construction of the cartridge of FIGURE 2. In FIGURE 3, the forward end of the bottom piece 3a is outwardly bent and anchored in an annular groove 18 of the case shaft 1b. The cartridge of FIGURE 3 does not have an annular flange at the rear end of the case shaft 1b. The forward end of the bottom piece 3b is open to allow the propellant powder charge 2b to fill the annular cylindrical part of the bottom piece 3b.

Figure 5:
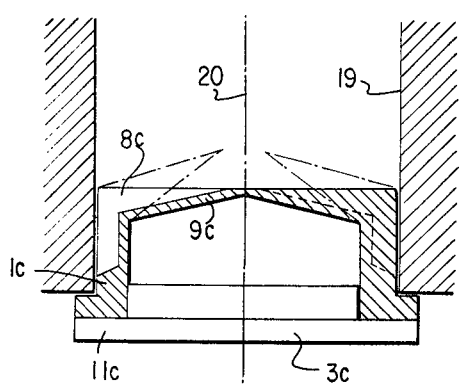
FIGURE 5 shows a propellant cartridge, with the case of FIGURES 4a and 4b, inserted into a smooth cylindrical forwardly opening cartridge bearing bore.
Figure 4A:
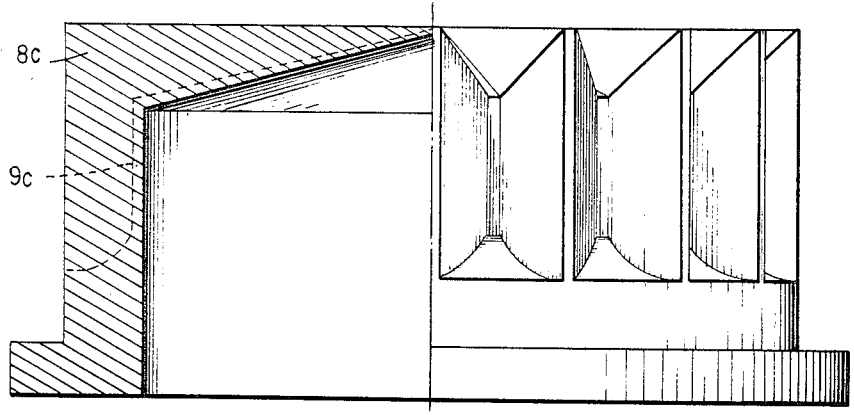
FIGURE 4a is a partial cross sectional elevation view, at a greatly enlarged scale, of another embodiment of the present invention.
Figure 4B:
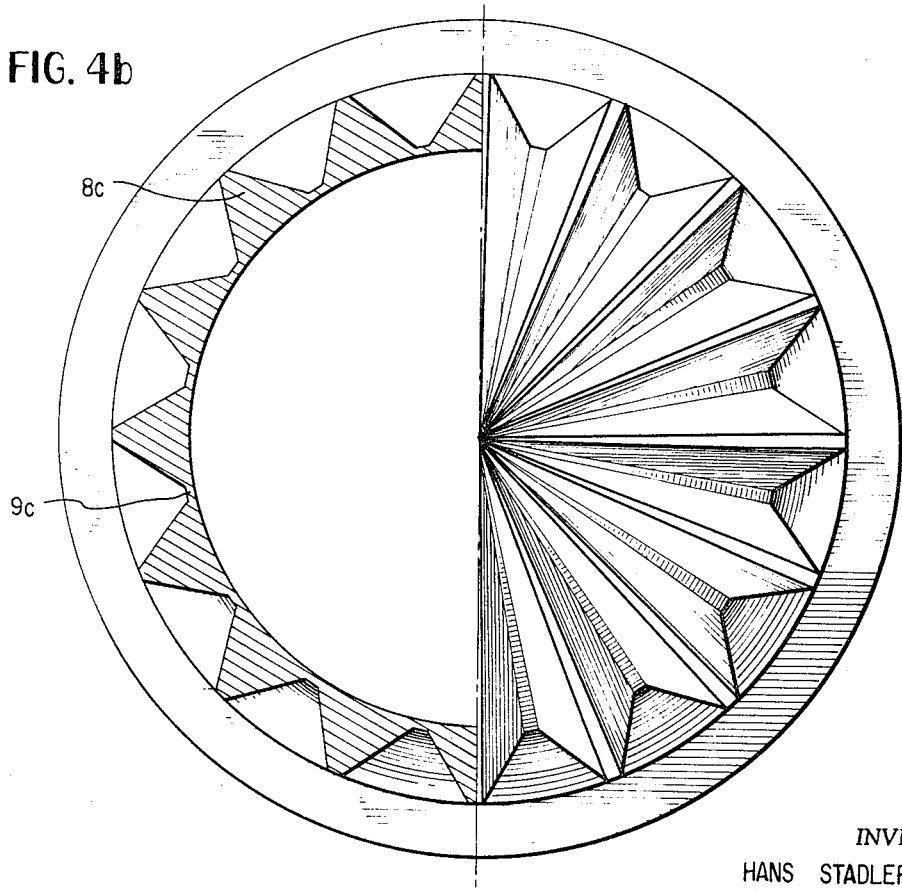

In FIGURES 4a and 4b, only the case shaft is shown. The forward end surfaces of the rib portions 8c terminate in a plane at right angles to the axis of the case shaft. The heights of the rib portions 8c decrease toward the center of the case shaft. The thin walled connecting webs 9c form a conical portion at the tip of the case shaft and decrease in thickness toward the center of the case shafts. The number and proportions of the rib portions 8c and the thin walled webs 9c may be chosen for various desirable design characteristics. In FIGURE 5, the case shaft of FIGURES 4a and 4b is shown inserted into a continuous cylindrical cartridge bearing bore 19. A bottom piece 3c containing a primer is pressed into the rear end of the case shaft 1c and supported by a flange-like rim 11c against the rear end face of the case shaft 1c. Due to the decreasing thickness of the thin walled web 9c toward the center line 20 of the case shaft 1c, the case shaft 1c will burst open in a conical manner starting from the center line 20 at the tip of the cartridge to assume the position shown in dotted lines, when the cartridge is fired. Since the rib portions 8c do not extend to the rear end face of the cartridge 1c, a pressure within the bearing bore 19 will produce a force that will assist the removal of the cartridge or automatically eject it if desired.

Figure 6:
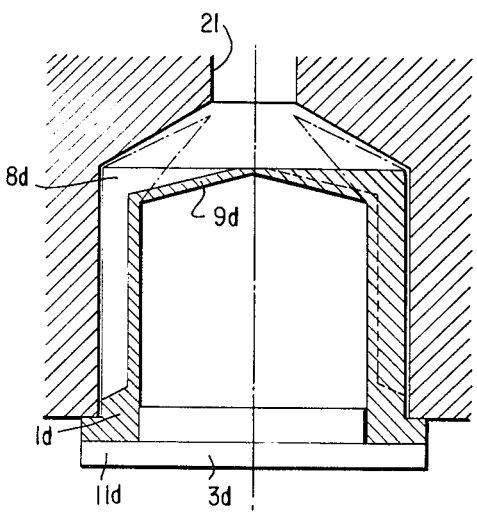
FIGURE 6 is an illustration of a cartridge identical to the cartridge shown in FIGURE 5, except that it is longer, in a cartridge bearing bore, which has an axial extension of reduced diameter.

In the cartridge case of FIGURE 6, corresponding numerals refer to corresponding parts of the cartridge case of FIGURE 5, except that the cartridge of FIGURE 6 has a greater axial length. The cartridge bearing bore of FIGURE 6 has a bore of reduced diameter 21 and a conical transition surface between the bores of different diameter. The reduced diameter bore 21 may be forwardly opened, if desired. The manner in which the forward end of the cartridge case shaft opens has been shown in dotted lines, similar to the dotted lines of FIGURE 5. The end face of the rib portions 8d are supported in abutting relationship with the conical portion of the cartridge bearing bore, which is particularly desirable with cartridges having a large propellant force.

Figure 7A:
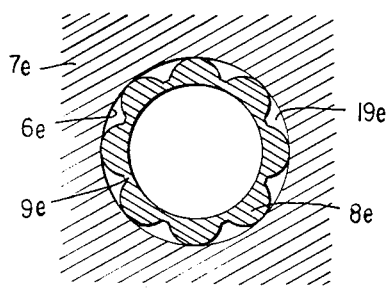
FIGURE 7a to 7d show different embodiments of the cross sectional shape for the ribbing of the case shaft in any of the preceding embodiments.

FIGURE 7a shows the cross sectional shape that the rib portions and thin walled webs may have in any of the embodiments according to the FIGURES 1–6, wherein the cases may be made of plastic and the web portions decrease in thickness toward the tip. The rib portions 8e have a relatively large cross sectional area and are connected with each other by means of the relatively narrow thin walled web 9e. Therefore, the space 19 between the rounded rib portions 8e, the thin walled web 9e and the bearing bore 6e of the piston 7e is relatively small.

Due to the shape of the rib portions 8e, there is a relatively large surface area of contact between the rib portions 8e and the bearing bore 6e, when the rib portions 8e are pressed against the bearing bore 6e by the pressure of the propellant charge gases.

Figure 7B:
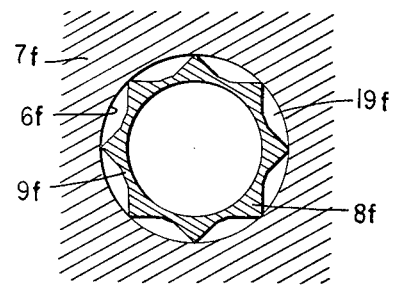
Figure 7C:
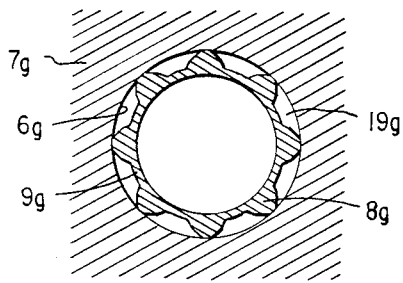
Figure 7D:
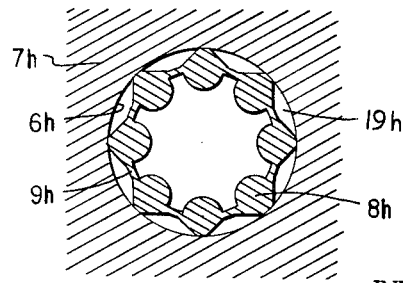

Considerably greater spaces 19f–19h and the smaller areas of contact between the rib portion 8f–8h and the bearing bores 6f–6h of the pistons 7f–7h are obtained with the cross-sectional configurations of FIGURES 7b–7d. Also, the width of the connecting thin walled webs 9f–9h is relatively larger than the width of the connecting thin walled webs 9e of FIGURE 7a. To obtain particularly strong rib portions 8h that will not rupture, the rib portions may be reinforced at the inside of the case shaft by rounded off portions as shown in FIGURE 7d; various other cross-sectional shapes of the inside portions may be used similar to the exterior forms of the rib portions 8 illustrated in the other figures.

The various embodiments are shown for purposes of illustration only, and further modifications and embodiments will readily be apparent to a person having ordinary skill in the art that are covered by the spirit and scope of the present invention as defined by the following claims.

We claim:

1. A propellant cartridge, comprising: a generally tubular cartridge case having a longitudinal axis, a completely closed homogeneously integral forward end and a rear end; a propellant powder charge operatively secured within said cartridge case; a bottom piece having a rearward end and a forward end, and being secured to the rear end of said cartridge case in a tightly sealed manner; said case having a plurality of rib portions starting from the forwardmost portion of said closed forward end substantially coincident with but not at the axis and continuously extending generally axially rearwardly; said case further having a plurality of webs continuously connecting with each other at the forward end coincident with the axis and being substantially radially thinner than adjacent ones of said rib portions; said webs consisting of material easily rupturable by the pressure of the propellant gases produced by the ignition of said powder charge to constitute means for quickly releasing the propellant gases through the ruptured webs burst at the forward end coincident with the axis and torn progressively rearwardly to form separate strips of said rib portions connected at their rearward ends to the remainder of said case.

2. The propellant cartridge of claim 1, wherein the radial thickness of said webs decreases toward the forward end of said cartridge case.

3. The propellant cartridge of claim 2, wherein said rib portions extend radially outward with respect to said webs and have external surfaces at the forward end of said case for substantially the full radial extent of said case that lie in a plane at right angles to the axis of said cartridge case.

4. The propellant cartridge of claim 3, wherein the internal surface of said forward end of said case is conical and said rib portions continuously decrease in axial height toward the axis of the cartridge case at the forward end.

5. The propellant cartridge of claim 2 wherein the rear of said bottom piece has a flange-like rim axially abutting the rear end of said case for supporting said bottom piece in the forward direction.

6. The propellant cartridge of claim 2 wherein said case shaft is made from thermoplastic material.

7. The propellant cartridge of claim 1, wherein said rib portions extend radially outward with respect to said webs and have external surfaces at the forward end of said case for substantially the full radial extent of said case that lie in a plane at right angles to the axis of said cartridge case.

8. The propellant cartridge of claim 7, wherein the internal surface of said forward end of said case is conical and said rib portions continuously decrease in axial height toward the axis of the cartridge case at the forward end.

9. The propellant cartridge of claim 7, wherein the rear of said bottom piece has a flange-like rim axially abutting the rear end of said case for supporting said bottom piece in the forward direction.

10. The propellant cartridge of claim 1 wherein said case shaft is made from thermoplastic material.

11. The propellant cartridge of claim 1, wherein the rear of said bottom piece has a flange-like rim axially abutting the rear end of said case for supporting said bottom piece in the forward direction.

12. The propellant cartridge of claim 1 wherein said case shaft is made from thermoplastic material.

13. The propellant cartridge of claim 1, wherein said rib portions extend rearwardly to approximately radially opposite the forward end of said bottom piece.

14. The propellant cartridge of claim 13, wherein the radial thickness of said webs decreases toward the forward end of said cartridge case.

15. The propellant cartridge of claim 13, wherein said rib portions extend radially outward with respect to said webs and have external surfaces at the forward end of said case for substantially the full radial extent of said case that lie in a plane at right angles to the axis of said cartridge case.

16. The propellant cartridge of claim 15, wherein the internal surface of said forward end of said case is conical and said rib portions continuously decrease in axial height toward the axis of the cartridge case at the forward end.

17. The propellant cartridge of claim 13, wherein said rib portions have a tapered profile cross section radially outward of said webs.

18. The propellant cartridge of claim 17, wherein said rib portions have a tapered profile cross section radially inwardly of said webs.

19. The propellant cartridge of claim 13, wherein said case has an integral unribbed portion rearwardly of and thicker than said webs, and the radially outer surfaces of said rib portions are axially aligned with the radially outer surfaces of said adjacent integral unribbed portion to form forwardly facing shoulder-shaped ledges between adjacent rib portions that are rearwardly and radially outwardly conically inclined to constitute pressure surface means for producing a rearwardly directed ejecting force from the propellant gases conducted rearwardly along said webs.

20. The propellant cartridge of claim 19, wherein the radial thickness of said webs decreases toward the forward end of said cartridge case.

21. The propellant cartridge of claim 19, wherein said rib portions extend radially outward with respect to said webs and have external surfaces at the forward end of said case for substantially the full radial extent of said case that lie in a plane at right angles to the axis of said cartridge case.

22. The propellant cartridge of claim 21, wherein the internal surface of said forward end of said case is conical and said rib portions continuously decrease in axial height toward the axis of the cartridge case at the forward end.

23. The propellant cartridge of claim 19 wherein the rear of said bottom piece has a flange-like rim axially abutting the rear end of said case for supporting said bottom piece in the forward direction.

24. The propellant cartridge of claim 19 wherein said case shaft is made from thermoplastic material.

25. The propellant cartridge of claim 1, wherein said rib portions have a tapered profile cross section radially outward of said webs.

26. The propellant cartridge of claim 25 wherein the radial thickness of said webs decreases toward the forward end of said cartridge case.

27. The propellant cartridge of claim 25, wherein said rib portions extend radially outward with respect to said webs and have external surfaces at the forward end of said case for substantially the full radial extent of said case that lie in a plane at right angles to the axis of said cartridge case.

28. The propellant cartridge of claim 27, wherein the internal surface of said forward end of said case is conical and said rib portions continuously decrease in axial height toward the axis of the cartridge case at the forward end.

29. The propellant cartridge of claim 25, wherein said rib portions have a tapered profile cross section radially inwardly of said webs.

30. The propellant cartridge of claim 25, wherein said case has an integral unribbed portion rearwardly of and thicker than said webs, and the radially outer surfaces of said rib portions are axially aligned with the radially outer surfaces of said adjacent integral unribbed portion to form forwardly facing shoulder-shaped ledges between adjacent rib portions that are rearwardly and radially outwardly conically inclined to constitute pressure surace means for producing a rearwardly directed ejecting force from the propellant gases conducted rearwardly along said webs.

References Cited

UNITED STATES PATENTS

| 3,093,073 | 6/1963 | Lockwood et al. | 102—42 |
| 3,144,827 | 8/1964 | Boutwell | 102—39 |

FOREIGN PATENTS

| 1,265,123 | 5/1961 | France. |
| 1,346,064 | 11/1963 | France. |
| 627,624 | 8/1949 | Great Britain. |
| 885,369 | 12/1961 | Great Britain. |

ROBERT F. STAHL, *Primary Examiner.*